(12) United States Patent
Hidaka et al.

(10) Patent No.: US 10,341,474 B1
(45) Date of Patent: *Jul. 2, 2019

(54) MOBILE DEVICE

(71) Applicant: KYOCERA Corporation, Kyoto-shi, Kyoto (JP)

(72) Inventors: Mizuho Hidaka, Kawasaki (JP); Norikazu Morioka, Tokyo (JP); Kotaro Nakamura, Osaka (JP); Tomoki Tsuchiya, Osaka (JP); Keiichi Nagoshi, Osaka (JP); Tetsuya Shimoda, Osaka (JP)

(73) Assignee: KYOCERA Corporation, Kyoto (JP)

( * ) Notice: Subject to any disclaimer, the term of this patent is extended or adjusted under 35 U.S.C. 154(b) by 455 days.

This patent is subject to a terminal disclaimer.

(21) Appl. No.: 15/162,206

(22) Filed: May 23, 2016

Related U.S. Application Data

(63) Continuation of application No. PCT/JP2014/081061, filed on Nov. 25, 2014.

(30) Foreign Application Priority Data

Nov. 25, 2013 (JP) ................................. 2013-242967

(51) Int. Cl.
  *H04M 1/02* (2006.01)
(52) U.S. Cl.
  CPC ......... *H04M 1/026* (2013.01); *H04M 1/0262* (2013.01)
(58) Field of Classification Search
  CPC ........................... H04M 1/026; H04M 1/0262
  USPC .......................................... 455/575.1–575.8
  See application file for complete search history.

(56) References Cited

U.S. PATENT DOCUMENTS

| | | | |
|---|---|---|---|
| 6,965,680 B2 | 11/2005 | Yamauchi et al. | |
| 8,611,945 B2 | 12/2013 | Hiwatashi | |
| 9,866,969 B2* | 1/2018 | Nakamura | H04M 1/03 |
| 2008/0037770 A1* | 2/2008 | Emmert | H04M 1/026 379/433.01 |
| 2008/0130931 A1* | 6/2008 | Hampton | H04R 1/2803 381/335 |
| 2008/0268793 A1* | 10/2008 | Nelson | H04M 1/0262 455/90.3 |
| 2010/0270052 A1* | 10/2010 | Crohas | B29C 45/14 174/50 |
| 2013/0279730 A1 | 10/2013 | Tanaka | |
| 2014/0270303 A1* | 9/2014 | Cheng | G06F 1/1626 381/333 |

FOREIGN PATENT DOCUMENTS

JP  H9-182189 A  7/1997
JP  2003-158565 A  5/2003
(Continued)

OTHER PUBLICATIONS

International Search Report and Written Opinion of the International Searching Authority issued by the Japanese Patent Office for International Application No. PCT/JP2014/081061.
(Continued)

*Primary Examiner* — Simon Nguyen
(74) *Attorney, Agent, or Firm* — Procopio Cory Hargreaves And Savitch LLP

(57) ABSTRACT

A mobile device is disclosed. A mobile device comprises a display, a battery disposed on the back side of the display, and a film speaker disposed on the back side of the battery.

7 Claims, 12 Drawing Sheets

(56) References Cited

FOREIGN PATENT DOCUMENTS

| JP | 2004-7400 A | 1/2004 |
| JP | 2009-081743 A | 4/2009 |
| JP | 2009-131740 A | 6/2009 |
| JP | 2009-272978 A | 11/2009 |
| JP | 2012-204913 A | 10/2012 |
| JP | 2012-227836 A | 11/2012 |
| JP | 2012-249331 A | 12/2012 |

OTHER PUBLICATIONS

International Search Report and Written Opinion of the International Searching Authority dated Jan. 6, 2015, for International Application No. PCT/JP2014/081060, 7 pages.

* cited by examiner

MOBILE DEVICE

CROSS-REFERENCE TO RELATED APPLICATION

The present application is a continuation based on PCT Application No. PCT/JP2014/081061 filed on Nov. 25, 2014, which claims the benefit of Japanese Application No. 2013-242967, filed on Nov. 25, 2013. PCT Application No. PCT/JP2014/081061 is entitled "MOBILE TERMINAL", and Japanese Application No. 2013-242967 is entitled "MOBILE DEVICE". The contents of which are incorporated by reference herein in their entirety.

FIELD

Embodiments of the present disclosure relate to a mobile device, and more particularly relate to a mobile device with a built-in speaker.

BACKGROUND

A mobile terminal with a built-in speaker has conventionally been proposed. In the mobile terminal, the speaker is disposed at a given angle in a corner portion of a housing to achieve size and thickness reduction of the mobile terminal.

SUMMARY

A mobile device is disclosed. In one embodiment, a mobile device comprises a display, a battery disposed on the back side of the display, and a film speaker disposed on the back side of the battery.

DETAILED DESCRIPTION

Figure 1A:
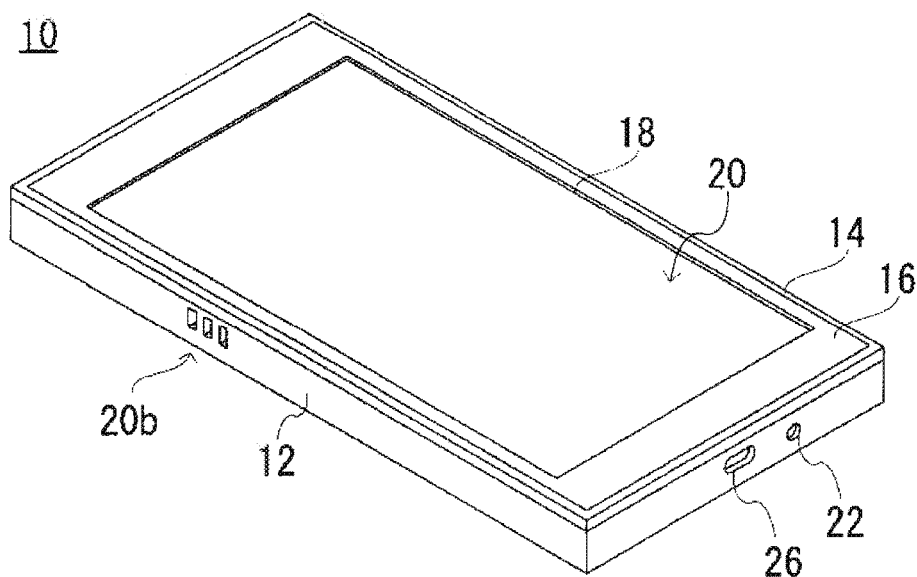
FIG. 1A illustrates an external view showing an example of an external appearance of a surface of a mobile device according to an embodiment of the disclosure.
Figure 1B:
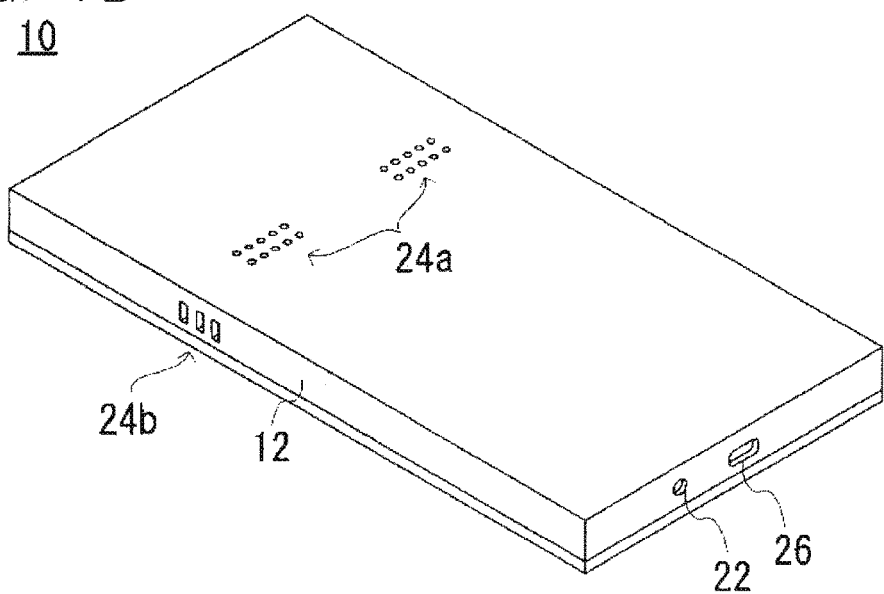
FIG. 1B illustrates an external view showing an external appearance of a back surface of the mobile device.

With reference to FIG. 1A and FIG. 1B, a mobile device (for example, a mobile phone) 10 in one embodiment is a smartphone as an example. An external appearance of the mobile device 10 includes a back panel 12, part of a mounting frame 14, and a front panel 16 so as to have an elongated flat rectangular shape, for example. It is previously pointed out that the disclosure is applicable to not only the smartphone but also any mobile devices such as a tablet PC (Personal Computer) and a PDA (Personal Digital Assistant).

A touch panel 20 may be formed integrally with the front panel 16. Further, a display 18 (display unit) includes for example, liquid crystals or organic EL (Electro-Luminescence) bonded to a back surface of the front panel 16.

A hole 22 for inputting sound to a microphone located inside the mobile device 10 is positioned on the right side of a lower side surface of the mobile device 10. A built-in piezoelectric element (not shown) for converting a sound signal to vibrations is included on the upper side of the mobile device 10. For example, when a sound signal is input to the piezoelectric element, the piezoelectric element converts the sound signal to vibrations and directly vibrates the display 18 (front panel 16). This allows a user to hear the sound output from the display 18. Since the sound is output in this manner, the mobile device 10 may not be supplied with a sound emitting hole for outputting a received voice, for example.

A first film speaker 30a and a second film speaker 30b that are described below are built in the mobile device 10. Sounds from the first film speaker 30a and the second film speaker 30b are output from not only two first sound emitting holes 24a located in a back surface of the back panel 12 but also two second sound emitting holes 24b located in side surfaces of the back panel 12 in one embodiment.

A hole 26 connected to a charging terminal (not shown) located inside is located in the middle of the lower side surface of the mobile device 10.

For example, when an operation of a call is performed to start the voice call, a received voice is output from the front panel 16 by vibrations of the piezoelectric element mentioned above. On the other hand, a speaking voice of a user is input to the microphone through the hole 22 and transmitted to a phone at the other end of the call. When an incoming call from the other phone is notified, a ringer tone is output from a built-in film speaker. The first film speaker 30a and the second film speaker 30b are built in the mobile device 10 in one embodiment, so that a stereo sound can also be reproduced.

When a charging connector is connected to the charging terminal through the hole 26, a secondary battery 44 (see FIG. 3) of the mobile device 10 can be supplied with charging power from an external power supply.

Figure 2A:
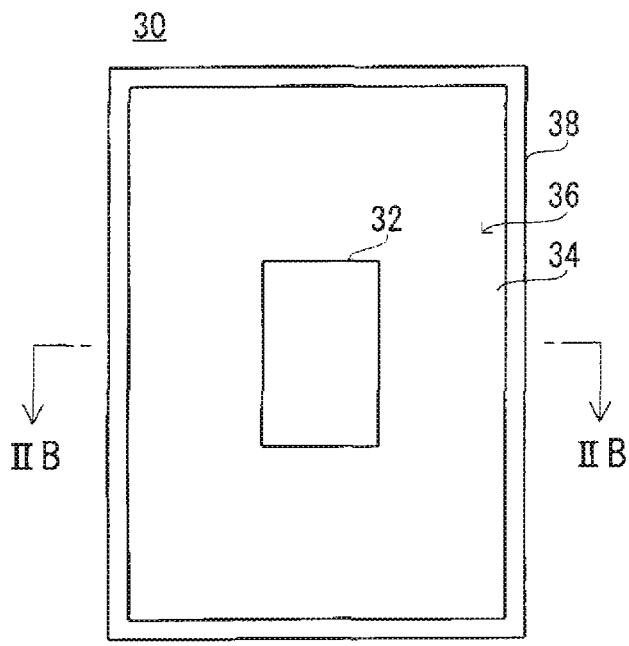
FIG. 2A illustrates an explanatory diagram showing an example of an external appearance of a film speaker built in the mobile device illustrated in FIG. 1 when viewed from front.
Figure 2B:
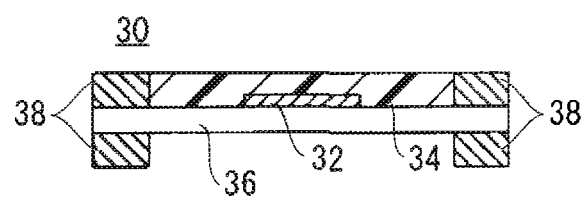
FIG. 2B illustrates an explanatory diagram showing an example of a section taken along a IIB-IIB line illustrated in FIG. 2A.

FIG. 2A illustrates an explanatory diagram showing an external appearance of a film speaker 30 used in one embodiment when viewed from the front. FIG. 2B illustrates a cross-sectional view taken along a IIB-IIB line illustrated in FIG. 2A. In addition, the film speaker 30 illustrated in this diagram is used as the first film speaker 30a and the second film speaker 30b built in the mobile device 10, and thus descriptions are given here without differentiating between a first film speaker and a second film speaker. Hereinafter, to differentiate between the first film speaker and the second film speaker, reference numbers 30a and 30b are respectively used.

The film speaker 30 is a flat rectangle and has a thickness of 0.7 mm, for example. The film speaker 30 comprises a piezoelectric element 32 having the same rectangular shape. The piezoelectric element 32 is located substantially in the center of the film speaker 30 when viewed from a surface of the film speaker 30 from which sound is output, namely, the front (FIG. 2A) of the film speaker 30. The piezoelectric element 32 is resin-coated with a resin coating layer 34. A resin film 36 is bonded to a surface of the resin coating layer 34. A frame 38 is located on the periphery of the film speaker 30 to support the resin coating layer 34 and the resin film 36. The application of a sound signal to the piezoelectric element 32 of such a film speaker 30 causes the piezoelectric element 32 to vibrate, and the vibrations are transmitted to the entire film speaker 30 comprising the resin coating layer 34 and the resin film 36, so that the sound is output from the front of the film speaker 30. In addition, the frame 38 is used when the film speaker 30 is fixed on a speaker holder 46 (described below).

Figure 3:
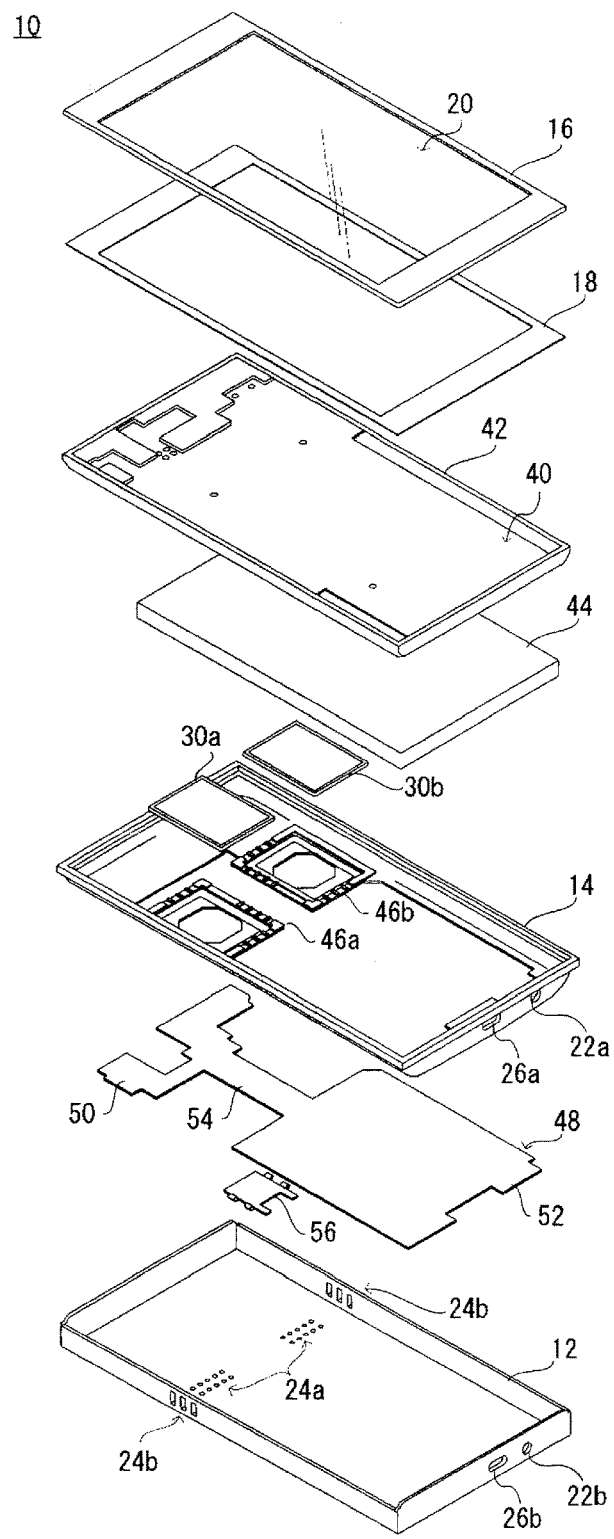
FIG. 3 illustrates an exploded perspective view showing an example of an outline of an internal structure of the mobile device illustrated in FIG. 1.

FIG. 3 illustrates an exploded perspective view showing an outline of an internal structure of the mobile device 10. With reference to FIG. 3, the mobile device 10 comprises the front panel 16, the display 18, an inner chassis 42, the secondary battery 44, the first film speaker 30a and the second film speaker 30b, the mounting frame 14, a substrate 48, a coupling member 56, and the back panel 12, and each part is mounted in the mobile device 10 in the stated order from the front (upper side in FIG. 3). The back panel 12 is mounted and cooperates with the mounting frame 14 to create space inside the back panel 12, and thus sounds from the first film speaker 30a and the second film speaker 30b are emitted from the first sound emitting holes 24a and the second sound emitting holes 24b to the outside of the space.

The main surface of the mobile device 10 includes the surface of front panel 16. The front panel 16 may be made of a glass so as to have an elongated flat rectangular shape, for example. As described above, the touch panel 20 may be formed integrally with the back surface of the front panel 16. The display 18 is bonded to the back surface of the front panel 16 with an adhesive or an optical clear adhesive (OCA) tape.

The inner chassis 42 comprises a rectangular resin frame and a shield plate 40 of metal (conductive material) located so as to cover almost the entire surface of the inside of the frame. The frame of the inner chassis 42 has a thickness equal to or slightly thinner than a thickness of a set of the shield plate 40 and the secondary battery 44 in layers. The front panel 16 to which the display 18 is bonded as described above is disposed on the front side of the inner chassis 42, namely, the front side of the shield plate 40. On the other hand, a recessed portion (not shown) for retaining the secondary battery 44 (allowing the secondary battery 44 to be fit therein) is provided on the back side of the inner chassis 42. Therefore, the secondary battery 44 is disposed on the back side of the display 18 with respect to the shield plate 40. The inner chassis 42 stably retains the secondary battery 44 on the back side of the display 18. In addition, the inner chassis 42, particularly the resin frame, is sometimes referred to as a battery retainer.

Figure 4A:
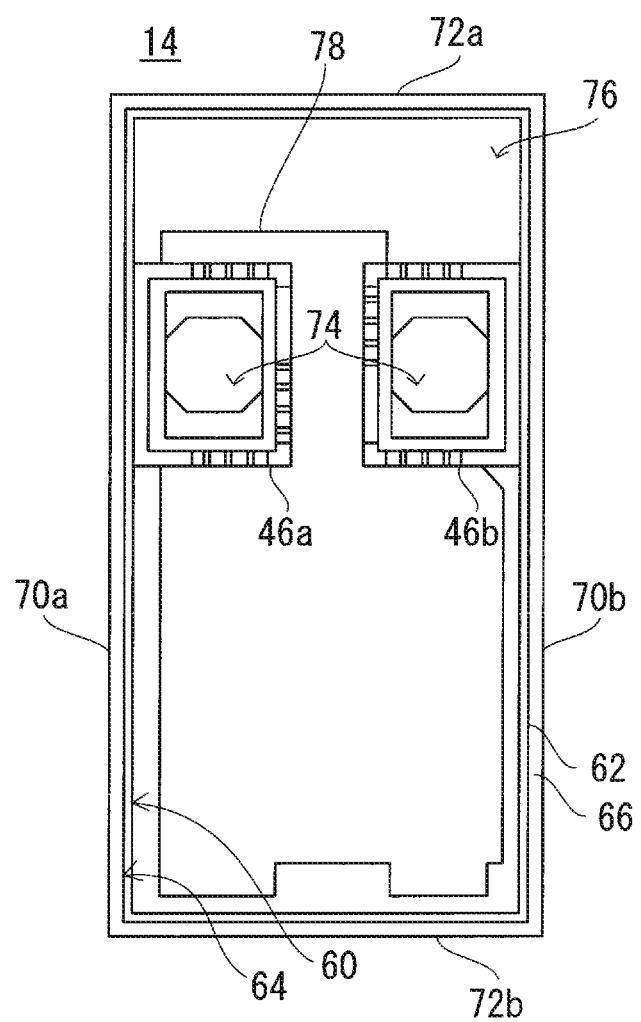
FIG. 4A illustrates an explanatory diagram showing an example of a state of a mounting frame illustrated in FIG. 2A and FIG. 2B.
Figure 4B:
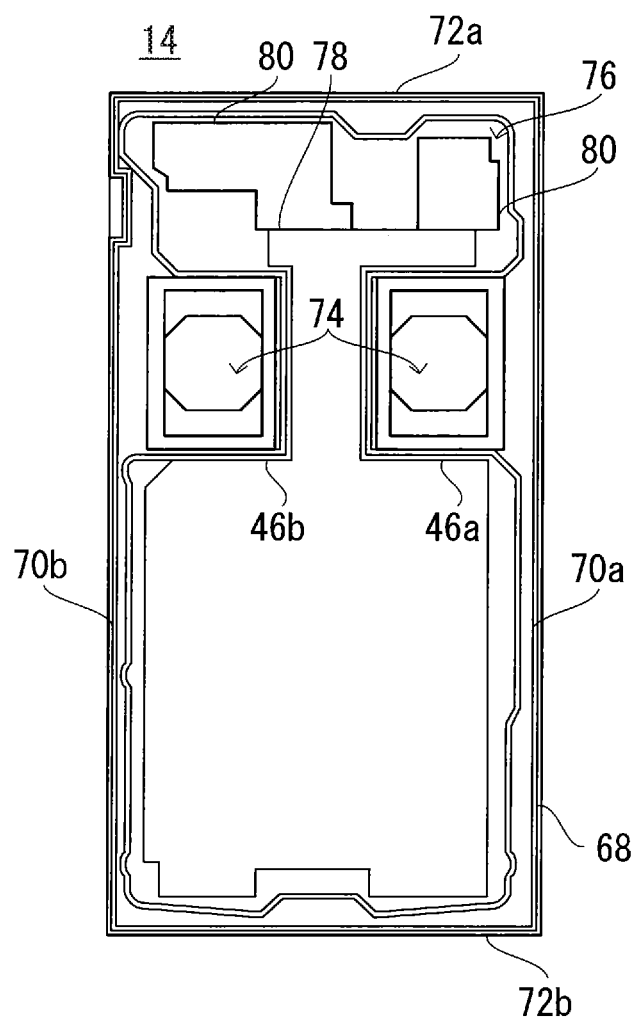
FIG. 4B illustrates an explanatory diagram showing a state of the mounting frame when viewed from the back side.

FIG. 4A illustrates a plan view showing an example of the mounting frame 14 when viewed from the front (also referred to as the front side), and FIG. 4B illustrates a plan view showing an example of the mounting frame 14 when viewed from the back side. With reference to FIG. 4A and FIG. 4B together with FIG. 3, the mounting frame 14 has a planar rectangular shape similarly to the front panel 16 and the inner chassis 42. A frame comprising a pair of vertical frames 70 (first pair of frame members) and a pair of horizontal frames 72 (second pair of frame members) may be formed together with each part described below by resin molding. Hereinafter, one and the other of the vertical frames 70 in a pair are also referred to as a first vertical frame 70a and a second vertical frame 70b, respectively, and one and the other of the horizontal frames 72 in a pair are also referred to as a first horizontal frame 72a and a second horizontal frame 72b, respectively. The first vertical frame 70a and the second vertical frame 70b are disposed at a predetermined interval. The first horizontal frame 72a connects the upper portions of the pair of the vertical frames 70 to each other. The second horizontal frame 72b connects the lower portions of the pair of the vertical frames 70 to each other.

Figure 5A:
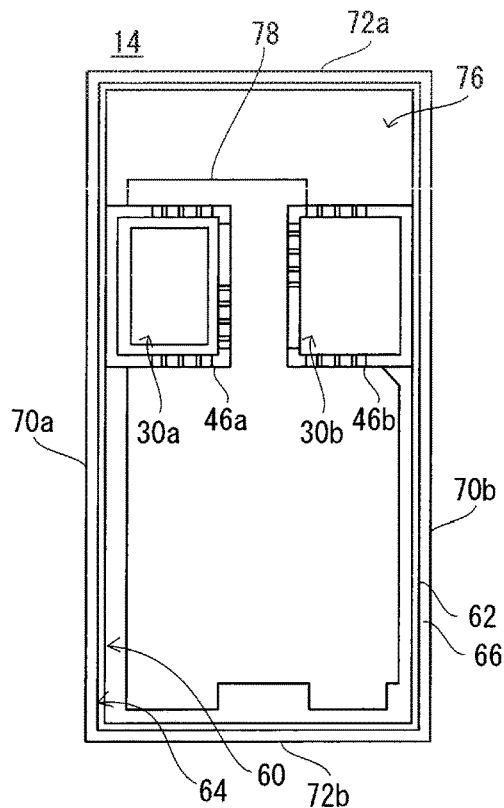
FIG. 5A illustrates an explanatory diagram showing an example of the front side of the mounting frame illustrated in FIGS. 2A and 2B to which a first film speaker and a second film speaker are attached, in which necessary parts are mounted.
Figure 5B:
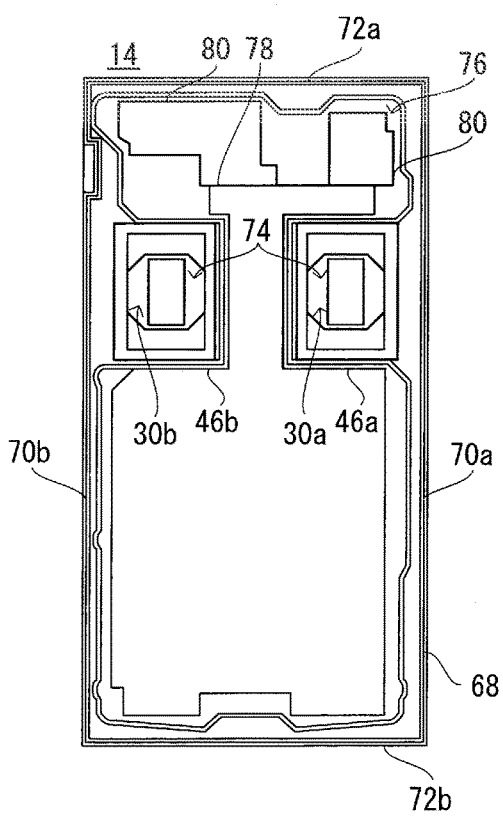
FIG. 5B illustrates an example of the back side of the mounting frame to which the first film speaker and the second film speaker are bonded.

A first speaker holder 46a and a second speaker holder 46b both having a plate shape are formed so as to extend inwardly respectively from the inside of the first vertical frame 70a and the inside of the second vertical frame 70b and to face each other in the direction in which they extend. Sound emitting holes 74 having a hexagonal shape, for example, are each formed in the center of the first speaker holder 46a and the second speaker holder 46b to emit sounds from the first film speaker 30a and the second film speaker 30b (FIG. 5B, for example) retained in the first speaker holder 46a and the second speaker holder 46b.

The first speaker holder 46a and the second speaker holder 46b have ribs 90 (see FIG. 9), which are described in detail below, on the peripheries of the front surfaces of the first speaker holder 46a and the second speaker holder 46b. The first speaker holder 46a and the second speaker holder 46b have the planar rectangular plate shape in one embodiment, but the shape of the first speaker holder 46a and the second speaker holder 46b is not limited to this. It suffices that the first speaker holder 46a and the second speaker holder 46b each have at least a region in which the frame 38 in FIG. 2A and FIG. 2B can be mounted (bonded). The sound emitting holes 74 may be larger or smaller.

The inner chassis 42 is fit in the frame of the mounting frame 14. Thus, the inner surfaces of the pair of vertical frames 70 and the pair of horizontal frames 72 have an interior wall surface 60 (also see FIGS. 6 and 8, for example) in which the inner chassis 42 can be fit. In other words, the interior wall surface 60 contacts the outer surface of the resin frame of the inner chassis 42, so that the inner chassis 42 is fit in the mounting frame 14.

Moreover, the mounting frame 14 has a panel supporter 62 and an interior wall surface 64 (also see FIGS. 6 and 8, for example) for housing the front panel 16 and allowing the front panel 16 to be mounted thereon. The panel supporter 62 and the interior wall surface 64 as well as the interior wall surface 60 have a step shape. More specifically, the panel supporter 62 is a planar portion extending outwardly from an end of the interior wall surface 60 on the front side of the mounting frame 14 (an end toward the front of the paper plane in FIG. 4A and FIG. 4B, and an end on the lower side of the paper plane in FIG. 6). The interior wall surface 64 extends from the outer end of the panel supporter 62 to the front side (the side toward the front of the paper plane in FIG. 4A and FIG. 4B, and the lower side of the paper plane in FIG. 6). The peripheral portion of the front panel 16 is disposed on the panel supporter 62. Thus, the front panel 16 is housed inside the interior wall surface 64.

A portion 66 (also see FIGS. 6 and 8, for example), which is located outside the interior wall surface 64, of each of the pair of vertical frames 70 and the pair of horizontal frames 72 is an exposed portion that is exposed as the exterior appearance (FIG. 1A and FIG. 1B) of the mobile device 10. Therefore, when the front panel 16 is mounted inside the interior wall surface 64 and on the panel supporter 62, the front surface of the front panel 16 is in the same plane or substantially the same plane as (is flush with) the front surface of the outer portion 66.

An assembly portion 76 on which parts such as a camera module are assembled is located from the inside of the first horizontal frame 72a to the upper ends of the first speaker holder 46a and the second speaker holder 46b. The assembly portion 76 has a rectangular hole 78 for allowing wiring to pass therethrough. Two substrate recessed portions 80 for allowing the substrate 48 with the shape illustrated in FIG. 3 to be disposed thereon are located in the assembly portion 76 on the back side (FIG. 4B) of the mounting frame 14. As seen from FIG. 3, the side surface of the second horizontal frame 72b has a hole 22a connected to the microphone and a hole 26a connected to the charging terminal.

Referring back to FIG. 3, the substrate 48 is made of resin, glass fiber, or the like, and has a first portion 50, a second portion 52 having a substantially rectangular shape, and a third portion 54 that has an elongated shape and connects the first portion 50 and the second portion 52 to each other. The substrate 48 comprises predetermined wiring formed thereon and comprises necessary parts such as the microphone mounted thereon.

It should be noted that the shape and the size of the first portion 50, the second portion 52, and the third portion 54 of the substrate 48 are not limited to the shape and the size in one embodiment.

The coupling member 56 is made of resin or the like and has a body portion and two locking portions 82 (see FIG. 6) located on each of the left and the right of the body portion.

The coupling member 56 couples the inner end portions, which face each other, of the first speaker holder 46a and the second speaker holder 46b. A means of mounting the coupling member 56 is described in detail below.

The side surfaces and the bottom surface (back surface) of the mobile device 10 includes a surface of the back panel 12 as illustrated in FIG. 1A and FIG. 1B. The back panel 12 may be made of resin so as to have a rectangular box shape. The bottom surface of the back panel 12 has the first sound emitting holes 24a, and the left and right side surfaces of the back panel 12 have the second sound emitting holes 24b. The lower side surface of the back panel 12 has a hole 22b connected to the microphone and a hole 26b connected to the charging terminal.

The inner chassis 42, the secondary battery 44, the first film speaker 30a, the second film speaker 30b, the substrate 48, and the coupling member 56 that are described above are mounted in the mounting frame 14. Then, the front panel 16 is mounted on the front side of the mounting frame 14 in which they are mounted, and the back panel 12 is mounted on the back side of the mounting frame 14.

Next, a procedure for mounting parts in the mounting frame 14 is described. First, with reference to FIG. 5A and FIG. 5B, the first film speaker 30a and the second film speaker 30b are respectively bonded to the first speaker holder 46a and the second speaker holder 46b with bonding means such as a double-faced tape on the front side of the mounting frame 14. At this time, the first film speaker 30a and the second film speaker 30b are bonded such that each of the surfaces from which sounds are emitted, namely, the front surface faces the corresponding sound emitting hole 74. The bonding means such as the double-faced tape (OCA tape) bonds the frames 38, which are illustrated in FIG. 2A and FIG. 2B, of the first film speaker 30a and the second film speaker 30b to the corresponding first speaker holder 46a and second speaker holder 46b. While the first film speaker 30a and the second film speaker 30b are bonded to the first speaker holder 46a and the second speaker holder 46b, the first film speaker 30a and the second film speaker 30b can be visually identified through the sound emitting holes 74 from the back side of the mounting frame 14.

Figure 5C:
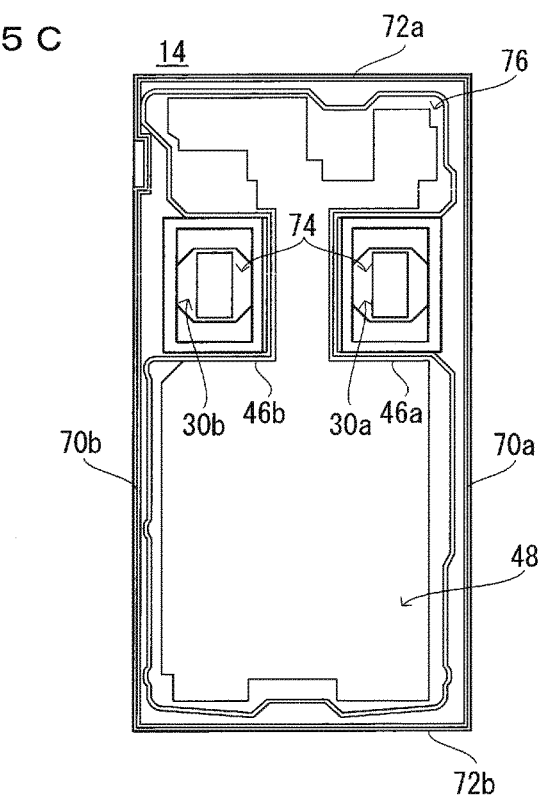
FIG. 5C illustrates an example of the back side of the mounting frame on which a substrate is disposed.
Figure 5D:
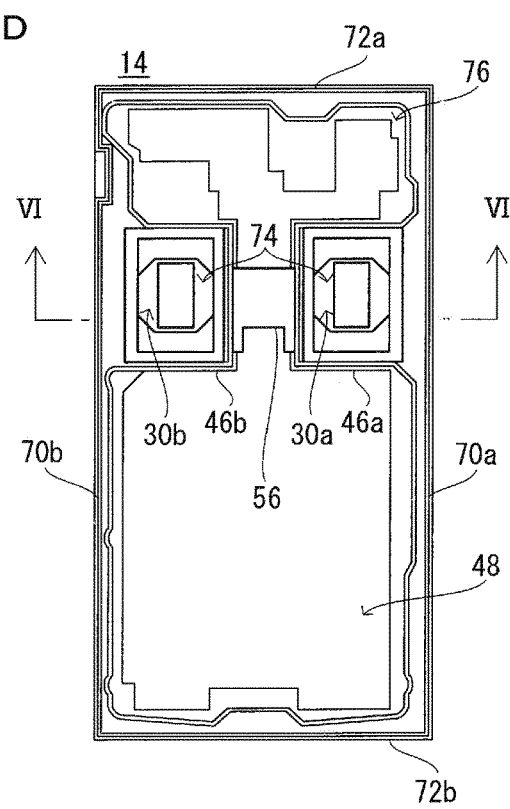
FIG. 5D illustrates an example of the back side of the mounting frame in which a coupling member couples inner end portions, which face each other, of a first speaker holder and a second speaker holder.

With reference to FIG. 5C and FIG. 5D, the substrate 48 is disposed on the back side of the mounting frame 14. At this time, the first portion 50 of the substrate 48 is disposed above the first speaker holder 46a and the second speaker holder 46b such that the first portion 50 overlaps part of the assembly portion 76, and the second portion 52 is disposed below the first speaker holder 46a and the second speaker holder 46b. The third portion 54 passes between the first speaker holder 46a and the second speaker holder 46b and is disposed in substantially the same plane as the first film speaker 30a and the second film speaker 30b. As a result, the hole 78 and the substrate recessed portions 80 in the assembly portion 76 are covered with the substrate 48. The substrate 48 is disposed on the back side of the mounting frame 14 so as to avoid the first film speaker 30a and the second film speaker 30b. Thus, for example, the first film speaker 30a and the second film speaker 30b can be disposed in the same plane or substantially the same plane as the substrate 48, so that the thickness can be further reduced. Moreover, the third portion 54 connects the first portion 50 and the second portion 52 to each other, and the coupling member 56 over the third portion 54 couples the first speaker holder 46a and the second speaker holder 46b. Thus, the first speaker holder 46a and the second speaker holder 46b having great rigidity can be realized without reducing an area that can be used for the substrate 48.

Next, as illustrated in FIG. 5D, the coupling member 56 over the third portion 54 of the substrate 48 is locked to the first speaker holder 46a and the second speaker holder 46b such that the coupling member 56 couples the inner end portions, which face each other, of the first speaker holder 46a and the second speaker holder 46b.

Figure 6:
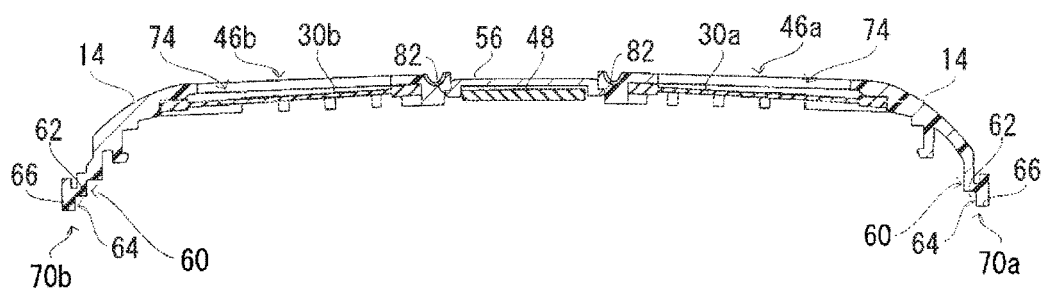
FIG. 6 illustrates an example of a section taken along a VI-VI line illustrated in FIG. 5D.

Specifically, with reference to FIG. 6 that is a cross-sectional view taken along a VI-VI line in FIG. 5D, each of the locking portions 82 located on the coupling member 56 has a hook on the tip. When the coupling member 56 on the back side of the mounting frame 14 is pushed from the upper side of the paper plane in FIG. 6, the locking portions 82 are temporarily bent inwardly. When the coupling member 56 is further pressed and the tips of the locking portions 82 reach the front side of the mounting frame 14, the shape of the locking portions 82 returns to the original shape. At this time, the hooks located on the tips of the locking portions 82 are caught on the peripheries of the first speaker holder 46a and the second speaker holder 46b, and thus the coupling member 56 is fixed between the first speaker holder 46a and the second speaker holder 46b.

As a result, the first speaker holder 46a and the second speaker holder 46b are in the state of being firmly coupled together with the coupling member 56, so that the first speaker holder 46a and the second speaker holder 46b have a both-end supported beam structure from a cantilever structure (the state in FIG. 4A and FIG. 4B, for example). In this manner, the first speaker holder 46a and the second speaker holder 46b are integrated, so that each of them has greater rigidity, and vibrations of the first speaker holder 46a and the second speaker holder 46b themselves can be suppressed. Thus, sound pressure levels of the first film speaker 30a and the second film speaker 30b can be increased.

For example, in a case where the first speaker holder 46a and the second speaker holder 46b are not coupled together with the coupling member 56, the first speaker holder 46a and the second speaker holder 46b remain in the cantilever structure, and the structure supporting the first film speaker 30a and the second film speaker 30b does not have great rigidity. If sounds are emitted from the first film speaker 30a and the second film speaker 30b in this state, the vibrations of the first film speaker 30a and the second film speaker 30b also cause the first speaker holder 46a and the second speaker holder 46b to vibrate, and the vibrations of the first speaker holder 46a and the second speaker holder 46b can diminish the vibrations of the first film speaker 30a and the second film speaker 30b. On the other hand, if the first speaker holder 46a and the second speaker holder 46b are coupled together with the coupling member 56 and have the both-end supported beam structure as in one embodiment, approximately 3 dB of improvement in the sound pressure can be seen.

As illustrated in FIG. 6, the mounting frame 14 is tilted from the center toward the first vertical frame 70a and the second vertical frame 70b, and the central portion is located higher than the first vertical frame 70a and the second vertical frame 70b. In a case where the back panel 12 is mounted on the mounting frame 14, an adhesive is applied to the coupling member 56, and the coupling member 56 and the back panel 12 are bonded together. In other words, the coupling member 56 is also fixed on the back panel 12. Therefore, the first speaker holder 46a and the second speaker holder 46b are reinforced also with the back panel 12, and the further improvement in the sound pressure is promising.

In another embodiment, the coupling member 56 may have a recessed portion to suppress a leak of the adhesive applied to the coupling member 56.

Figure 7A:
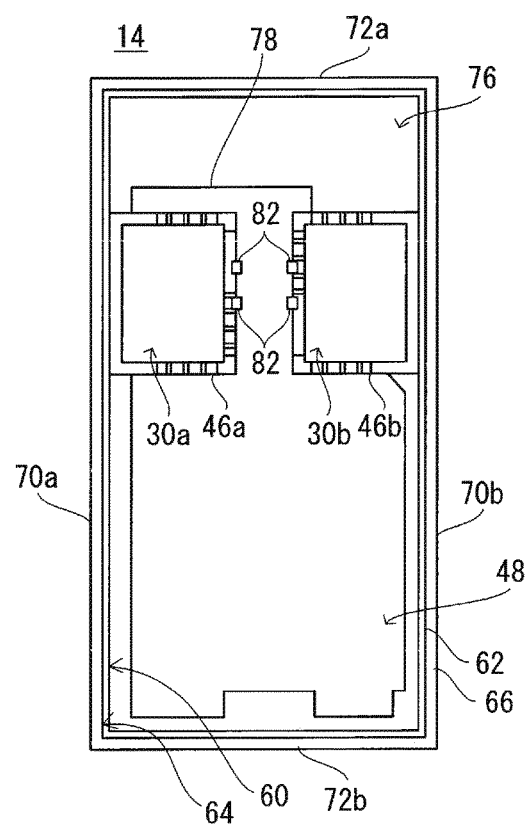
FIG. 7A illustrates an example of a state of the mounting frame illustrated in FIG. 5D before the inner chassis is fit in the mounting frame.

FIG. 7A illustrates an explanatory diagram showing a state of the mounting frame 14 illustrated in FIG. 5D before the inner chassis 42 is fit in the mounting frame 14. FIG. 7A illustrates a diagram when viewed from the front (front side), and the substrate 48 and the coupling member 56 are mounted on the mounting frame 14 in one example of FIG. 7A. In this state, part of the substrate 48 is seen through the hole 78. Further, the hooks on the tips of the locking portions 82 of the coupling member 56 are caught on the right side of the first speaker holder 46a and the left side of the second speaker holder 46b. As illustrated in FIG. 7A, the coupling member 56 couples the first speaker holder 46a and the second speaker holder 46b such that the locking portions 82 are fit in part of slits 92 (described below) of the first speaker holder 46a and the second speaker holder 46b.

Figure 7B:
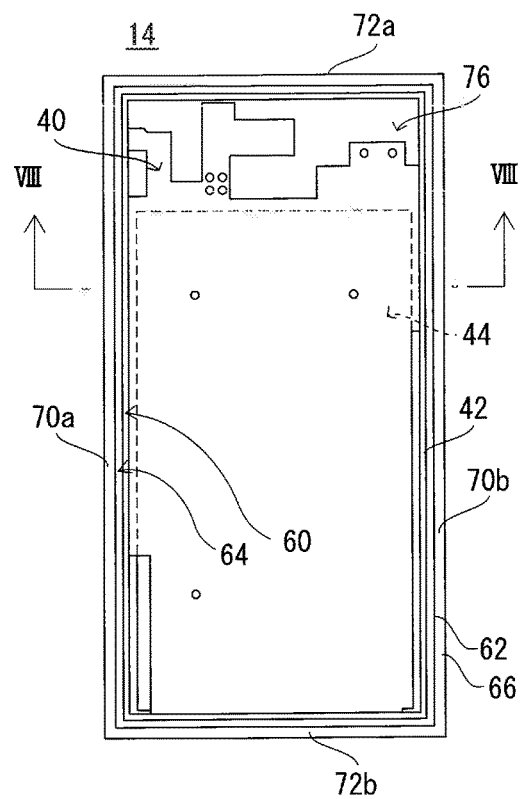
FIG. 7B illustrates an example of a state of the mounting frame illustrated in FIG. 7A after the inner chassis is fit in the mounting frame.

With reference to FIG. 7B, the inner chassis 42 retaining the secondary battery 44 is fit in the mounting frame 14 in this state, and thus the inner chassis 42 covers the substrate 48, the first film speaker 30a, the second film speaker 30b, the first speaker holder 46a, the second speaker holder 46b, or the like. In FIG. 7B, the secondary battery 44 is indicated by a broken line.

Figure 8:
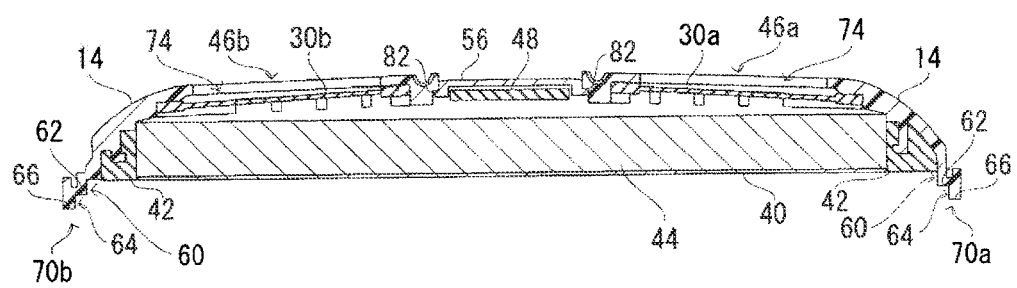
FIG. 8 illustrates an example of a section taken along a VIII-VIII line illustrated in FIG. 7B.

With reference to FIG. 8 illustrating a cross-sectional view taken along a VIII-VIII line in FIG. 7B, it is clearly seen that the inner chassis 42 retains the secondary battery 44. The secondary battery 44 is disposed on the mounting frame 14 and the shield plate 40, so that the secondary battery 44 is difficult to come off the inner chassis 42.

Then, the first film speaker 30a and the second film speaker 30b are in the state of being retained on the back side of the secondary battery 44 by the first speaker holder 46a and the second speaker holder 46b. In other words, the first speaker holder 46a and the second speaker holder 46b stably retain the first film speaker 30a and the second film speaker 30b on the back side of the secondary battery 44.

At this time, the first film speaker 30a and the second film speaker 30b are disposed side by side on the back side of the secondary battery 44, so that the two sound sources are not too far away from each other, and a monophonic sound and a stereo sound tend to sound natural when being reproduced.

In this manner, the mobile device 10 as a whole can be reduced in thickness by using the film speakers and disposing the film speakers on the back side of the secondary battery.

As illustrated in FIG. 8, the inner chassis 42 retaining the secondary battery 44 is fit in the interior wall surface 60 of the mounting frame 14. The frame of the inner chassis 42 has a thickness including a thickness of the shield plate 40 and a thickness of part of the secondary battery 44. The mounting frame 14 has a thickness including the thickness of the shield plate 40, the thickness of the inner chassis 42, and the thickness of the secondary battery 44. Thus, even when the inner chassis 42 including the secondary battery 44 fit therein is fit in the mounting frame 14, the thickness of the mounting frame 14 remains unchanged. In other words, the secondary battery 44 and the inner chassis 42 are completely housed inside the mounting frame 14 and do not protrude from the mounting frame 14. This configuration also allows the mobile device 10 as a whole to be reduced in thickness.

Figure 9A:
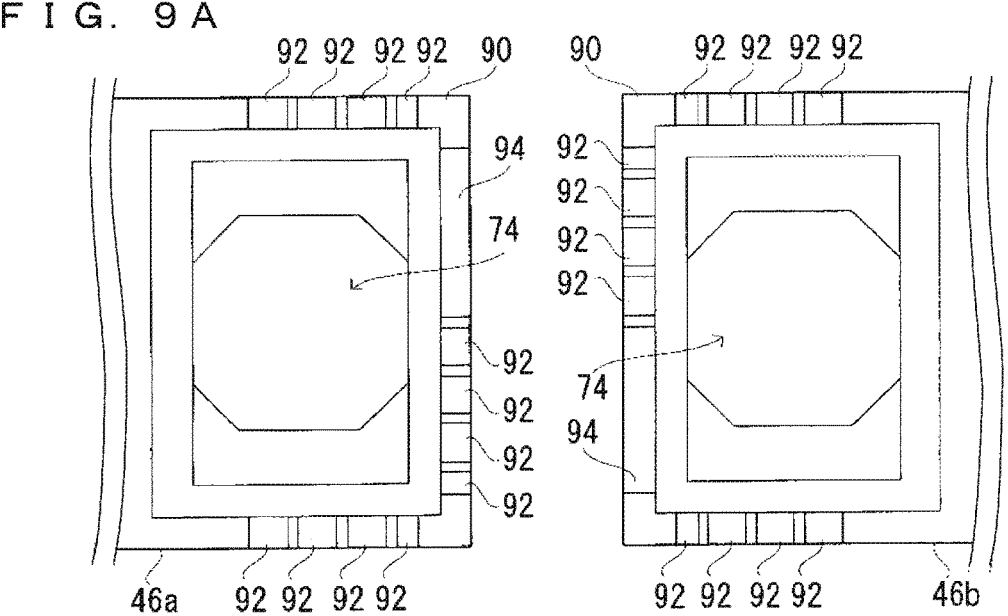
FIG. 9A illustrates an enlarged view showing an example of details of the first speaker holder and the second speaker holder illustrated in FIG. 4A viewed from the front side of the mounting frame.
Figure 9B:
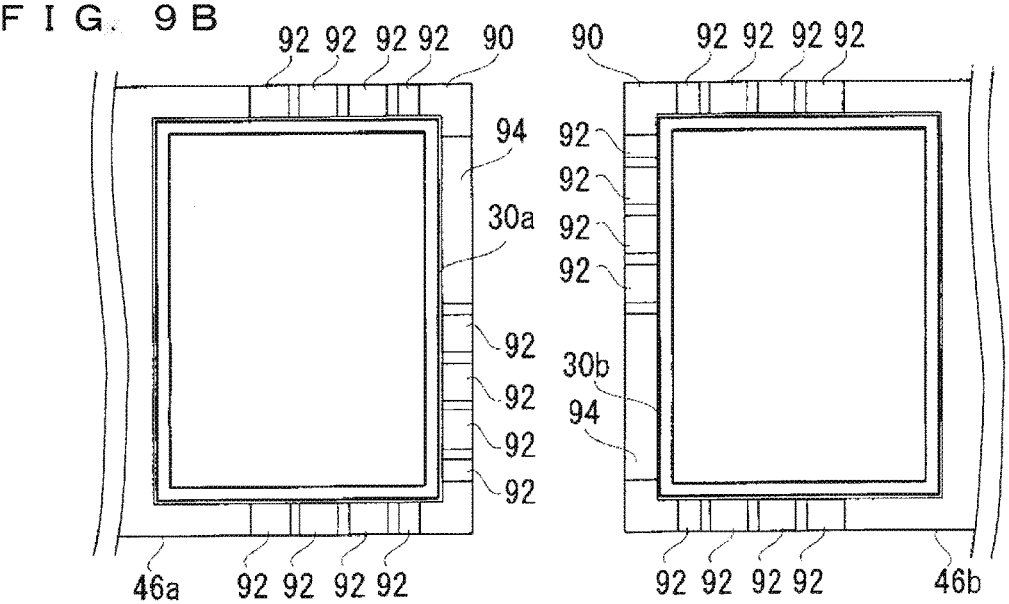
FIG. 9B illustrates an example of a state where the first film speaker and the second film speaker are bonded to the first speaker holder and the second speaker holder illustrated in FIG. 9A.

FIG. 9A and FIG. 9B illustrate enlarged views showing details of the first speaker holder 46a and the second speaker holder 46b. With reference to FIG. 9A, the peripheries of the first speaker holder 46a and the second speaker holder 46b are surrounded by the ribs 90. The ribs 90 have a height set to be higher than a thickness (height) of the first film speaker 30*a* and the second film speaker 30*b* bonded to the first speaker holder 46*a* and the second speaker holder 46*b*. Therefore, when the first film speaker 30*a* and the second film speaker 30*b* are bonded to the first speaker holder 46*a* and the second speaker holder 46*b*, the ribs 90 are higher than the first film speaker 30*a* and the second film speaker 30*b*. In other words, the ribs 90 protrude to the front side (toward the secondary battery 44) more than the first film speaker 30*a* and the second film speaker 30*b*. The rib 90 of the first speaker holder 46*a* has slits 92 at a total of 12 places including 4 places on the upper side, 4 places on the lower side, and 4 places on the right side (center side of the mobile device 10). The rib 90 of the first speaker holder 46*a* has a wiring recessed portion 94 on the right side thereof to allow wiring connected to the first film speaker 30*a* to pass through the wiring recessed portion 94. Similarly, the rib 90 of the second speaker holder 46*b* has the slits 92 at a total of 12 places including 4 places on the upper side, 4 places on the lower side, and 4 places on the left side (center side of the mobile device 10), and has the wiring recessed portion 94 on the left side of the rib 90. The slits 92 are disposed at an interval on the periphery of each of the first speaker holder 46*a* and the second speaker holder 46*b*. The slits 92 have openings on the secondary battery 44 side while penetrating the ribs 90 in a parallel direction to the substrate 48 (in a parallel direction to the paper plane of FIG. 9). It should be noted that the number and the size (length or width) of the slits 92 are not limited to those in one embodiment.

With reference to FIG. 9B, when the first film speaker 30*a* and the second film speaker 30*b* are mounted in the first speaker holder 46*a* and the second speaker holder 46*b*, the first speaker holder 46*a* and the second speaker holder 46*b* retain the first film speaker 30*a* and the second film speaker 30*b* while the ribs 90 surround the first film speaker 30*a* and the second film speaker 30*b*.

Figure 10:
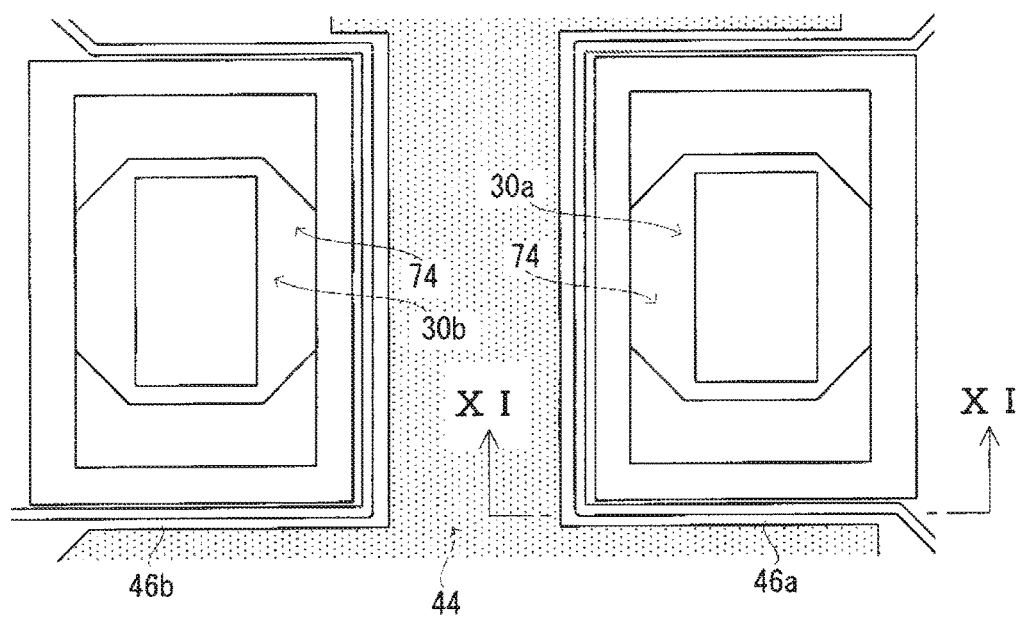
FIG. 10 illustrates an explanatory diagram showing an example of a state of the first speaker holder and the second speaker holder illustrated in FIG. 9B when viewed from the back side and a state where a secondary battery is disposed on the front side of the mounting frame.

FIG. 10 illustrates a diagram of the first speaker holder 46*a* and the second speaker holder 46*b* illustrated in FIG. 9B when viewed from the back side. In one example of FIG. 9B, the secondary battery 44 is disposed on the front side of the mounting frame 14. In this state, the front of the first film speaker 30*a* and the front of the second film speaker 30*b* are seen through the sound emitting holes 74 of the first speaker holder 46*a* and the second speaker holder 46*b*. The first film speaker 30*a* and the second film speaker 30*b* are in the state of being disposed on the back side of the secondary battery 44.

Figure 11:
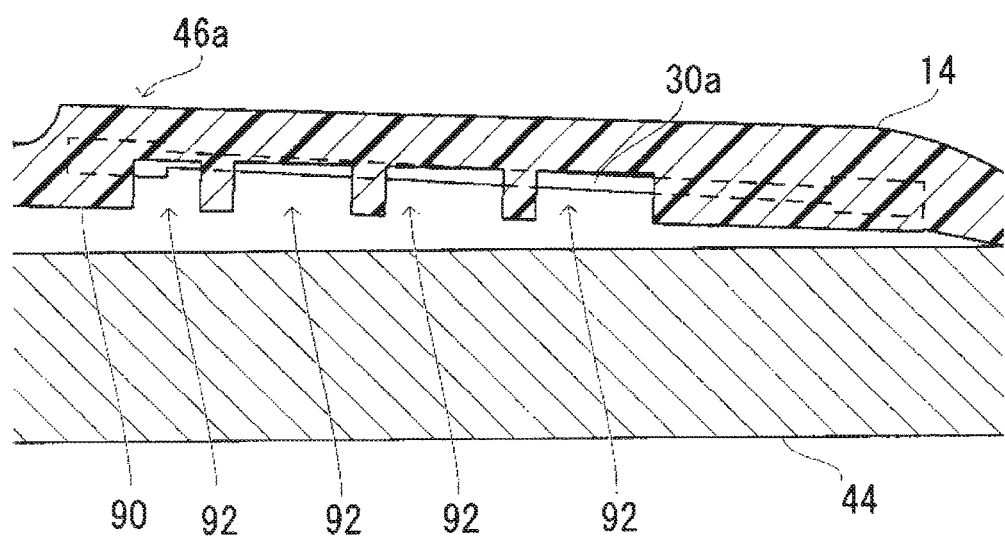
FIG. 11 illustrates an example of a section taken along an XI-XI line illustrated in FIG. 10.

FIG. 11 illustrates a cross-sectional view taken along an XI-XI line in FIG. 10 and mainly illustrates a section of the rib 90 of the first speaker holder 46*a* retaining the first film speaker 30*a*. With reference to FIG. 11, the upper end face (lower side in FIG. 11) of the rib 90 faces the back surface of the secondary battery 44. The rib 90 is higher than the first film speaker 30, and thus substantially the entire first film speaker 30*a* is covered with the rib 90 and part of the first film speaker 30*a* can be confirmed through the slits 92 in the cross-sectional view. The upper end face of the rib 90 higher than the first film speaker 30*a* faces the secondary battery 44, to thereby keep a gap between the secondary battery 44 and the first film speaker 30*a*. In other words, in a case where the secondary battery 44 is expanded over time by being repeatedly charged and discharged, the rib 90 functions as a stopper and the upper end face of the rib 90 contacts the main surface of the expanded secondary battery 44. Therefore, the main surface of the secondary battery 44 is difficult to be further displaced toward the first film speaker 30*a*.

Therefore, the rib 90 can stably keep the gap between the first film speaker 30*a* and the secondary battery 44.

With the rib 90 surrounding the first film speaker 30*a*, the inner space and the outer space of the rib 90 that houses the first film speaker 30*a* or the second film speaker 30*b* communicate with each other through the slits 92. Thus, a rear volume of the first film speaker 30*a* can be sufficiently kept, and acoustic performance of the first film speaker 30*a* can be improved.

The rib 90 located on the upper side and the left side (center side) of the first speaker holder 46*a*, the rib 90 of the second speaker holder 46*b*, and the second film speaker 30*b* are substantially the same as those in FIG. 11, and thus detailed drawings are omitted.

Figure 12:
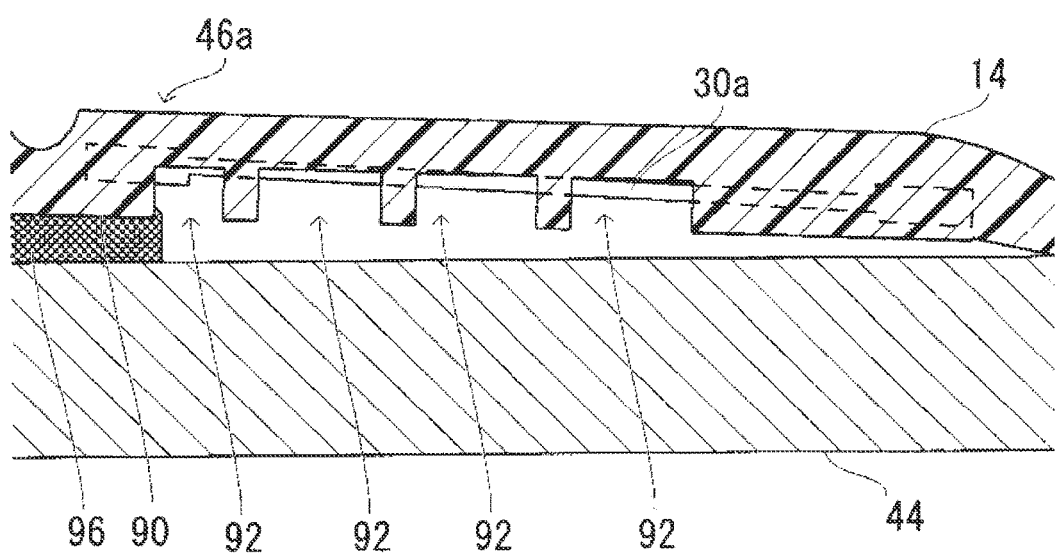
FIG. 12 illustrates an example of another embodiment of a section taken along the XI-XI line illustrated in FIG. 10.

With reference to FIG. 12, in another embodiment, the first speaker holder 46*a* (for example, the rib 90) may be fixed on (bonded to) the secondary battery 44 with a fixing portion such as an adhesive 96 or fixing means to further improve the sound pressure level of the first film speaker 30*a*. The first speaker holder 46*a* is fixed on the secondary battery 44 by using the secondary battery 44 having the greatest weight in the mobile device 10 and great rigidity as in one embodiment.

The second speaker holder 46*b* (for example, the rib 90) may be bonded to the secondary battery 44 with the adhesive 96 or the like similarly to the first speaker holder 46*a*, which is omitted from the diagram.

In one embodiment in FIG. 12 as described above, the rib 90, for example, is fixed on the secondary battery 44, and the rib 90 and the secondary battery 44 are integrated, so that the rigidity of the first speaker holder 46*a* and the second speaker holder 46*b* is reinforced with the rigidity of the secondary battery 44, to thereby further increase the rigidity of the first speaker holder 46*a* and the second speaker holder 46*b*. As a result, the vibrations of the first speaker holder 46*a* and the second speaker holder 46*b* caused by the vibrations of the first film speaker 30*a* and the second film speaker 30*b* can be suppressed. Consequently, the sound pressure levels of the first film speaker 30*a* and the second film speaker 30*b* can be increased.

By fixing the first speaker holder 46*a* and the second speaker holder 46*b* on the secondary battery 44, the first film speaker 30*a* and the second film speaker 30*b* can keep a fixed distance from the secondary battery 44 at the occurrence of the phenomenon in which the secondary battery 44 is expanded over time by being repeatedly charged and discharged. Thus, variations in the rear volume of the first film speaker 30*a* and the second film speaker 30*b* can be suppressed.

In one embodiment in FIG. 12, the first speaker holder 46*a* and the second speaker holder 46*b* may be fixed on the secondary battery 44 with a double-faced tape or a fitting (locking) mechanism.

Further, in one embodiment described above, the substrate 48 includes the first portion 50, the second portion 52, and the third portion 54, but the shape of the substrate 48 may be modified in various ways.

For example, the substrate 48 may be formed as one large rectangular substrate and may be disposed so as to overlap the mounting frame 14. In this case, it cannot be expected that the substrate 48 is reduced in thickness by being disposed between the first film speaker 30*a* and the second film speaker 30*b*, but the first speaker holder 46*a* and the second speaker holder 46*b* do not need to be located separately. Thus, the both-end supported beam structure is applicable as the structure of the first speaker holder 46*a* and the second speaker holder 46b without using the coupling member 56, which can increase the rigidity.

Alternatively, the substrate may have only a part corresponding to only the second portion 50. Also in this case, the first speaker holder 46a and the second speaker holder 46b that are integrated can be formed while the coupling member 56 is omitted.

In one embodiment, the first film speaker 30a, the second film speaker 30b, and the ribs 90 have the rectangular shape, but at least any one of them may have a circular shape or another shape instead of the rectangular shape in another embodiment.

In one embodiment, the ribs 90 are formed so as to surround the first film speaker 30a and the second film speaker 30b, that is to say, the ribs 90 are formed all around the first film speaker 30a and the second film speaker 30b. In still another embodiment, the ribs 90 may include only ribs corresponding to at least one side of the first film speaker 30a and the second film speaker 30b. The ribs 90 may not surround the first film speaker 30a and the second film speaker 30b.

One embodiment described above comprises the two film speakers 30a, 30b, but the film speaker 30 may comprise only one of them to further reduce the mobile device in size or to further increase the inner space. In this case, only one group of the first sound emitting holes 24a are located in the main surface of the housing member, and only one group of the second sound emitting holes 24b are located in positions corresponding to the first sound emitting holes 24a in the side surface of the housing member. In the case where only one film speaker 30 is used as described above, sounds may be output from both of the first sound emitting holes 24a and the second sound emitting holes 24b located at some distance from the first sound emitting holes 24a, thereby providing a better sense of realism than the case where only the first sound emitting holes 24a are formed.

Any specific numeric values in the disclosure are merely an example, and may be changed suitably according to modifications of specifications of products.

Some examples of the points in one embodiment are summarized below. In a first aspect of one embodiment, a mobile device comprises a display, a battery disposed on the back side of the display, and a film speaker disposed on the back side of the battery.

A second aspect of one embodiment is dependent on the first aspect. The mobile device further comprises a speaker holder retaining the film speaker on the back side of the battery.

A third aspect of one embodiment is dependent on the second aspect. The speaker holder retains the film speaker inside the speaker holder and comprises a rib higher than a thickness of the film speaker, an upper end face of the rib facing the battery.

A fourth aspect of one embodiment is dependent on the third aspect. At least part of the rib has a slit.

A fifth aspect of one embodiment is dependent on the third aspect or the fourth aspect. The mobile device further comprises a fixing portion fixing the rib on the battery.

A sixth aspect of one embodiment is dependent on any of the second aspect to the fifth aspect. The film speaker comprises a first film speaker and a second film speaker, and the speaker holder comprises a first speaker holder retaining the first film speaker and a second speaker holder retaining the second film speaker.

A seventh aspect of one embodiment is dependent on the sixth aspect. The mobile device further comprises a mounting frame that comprises a first pair of frame members disposed at an interval and a second pair of frame members coupling the first pair of frame members. The first speaker holder and the second speaker holder are formed so as to extend inwardly from the inside of each of the first pair of frame members and to face each other.

An eighth aspect of one embodiment is dependent on the seventh aspect. The mobile device further comprises a coupling member coupling inner end portions, which face each other, of the first speaker holder and the second speaker holder.

A ninth aspect of one embodiment is dependent on the eighth aspect. The mobile device further comprises a substrate having a first portion, a second portion, and a third portion that connects the first portion and the second portion to each other. The third portion of the substrate passes between the first speaker holder and the second speaker holder and is disposed in the same plane or substantially the same plane as the first film speaker and the second film speaker. The coupling member over the third portion of the substrate couples the first speaker holder and the second speaker holder.

A tenth aspect of one embodiment is dependent on any of the seventh aspect to the ninth aspect. The mobile device further comprises a battery retainer retaining the battery on the back side of the display. The battery retainer is mounted in the mounting frame while retaining the battery.

An eleventh aspect of one embodiment is dependent on any of the first aspect to the tenth aspect. The mobile device further comprises a back panel having a sound emitting hole.

The disclosure is described in detail, but the above description is the exemplification in all aspects and embodiments of the present disclosure are not intended to be limited thereto. It is construed that numerous modifications which are not exemplified can be envisaged without departing from the scope of the present disclosure.

The invention claimed is:

1. A mobile device, comprising:
   a display;
   a battery disposed on a back side of the display;
   a film speaker disposed on a back side of the battery;
   a speaker holder that retains the film speaker on the back side of the battery,
   wherein the speaker holder retains the film speaker inside the speaker holder and comprises a rib higher than a thickness of the film speaker, an upper end face of the rib facing the battery.

2. The mobile device according to claim 1, wherein at least part of the rib includes a slit.

3. The mobile device according to claim 1, further comprising a fixing portion fixing the rib on the battery.

4. The mobile device according to claim 1, wherein
   the film speaker comprises a first film speaker and a second film speaker, and
   the speaker holder comprises a first speaker holder retaining the first film speaker and a second speaker holder retaining the second film speaker.

5. The mobile device according to claim 4, further comprising a mounting frame that comprises a first pair of frame members disposed at an interval and a second pair of frame members coupling the first pair of frame members,
   wherein the first speaker holder and the second speaker holder are located so as to extend inwardly from the inside of each of the first pair of frame members and to face each other.

6. The mobile device according to claim 5, further comprising a coupling member that couples inner end portions, which face each other, of the first speaker holder and the second speaker holder.

7. A mobile device, comprising:
a display;
a battery disposed on the back side of the display;
a film speaker disposed on the back side of the battery;
a speaker holder that retains the film speaker on the back side of the battery,
wherein the film speaker comprises a first film speaker and a second film speaker, and the speaker holder comprises a first speaker holder retaining the first film speaker and a second speaker holder retaining the second film speaker;
a mounting frame that comprises a first pair of frame members disposed at an interval and a second pair of frame members coupling the first pair of frame members, wherein the first speaker holder and the second speaker holder are located so as to extend inwardly from the inside of each of the first pair of frame members and to face each other;
a coupling member that couples inner end portions, which face each other, of the first speaker holder and the second speaker holder;
a substrate including a first portion, a second portion, and a third portion that connects the first portion and the second portion to each other, wherein
the third portion of the substrate passes between the first speaker holder and the second speaker holder and is disposed in the same plane or substantially the same plane as the first film speaker and the second film speaker, and
the coupling member over the third portion of the substrate couples the first speaker holder and the second speaker holder.

* * * * *